(12) United States Patent
Dulloor et al.

(10) Patent No.: US 9,645,939 B2
(45) Date of Patent: May 9, 2017

(54) HARDWARE APPARATUSES AND METHODS FOR DISTRIBUTED DURABLE AND ATOMIC TRANSACTIONS IN NON-VOLATILE MEMORY

(71) Applicant: Intel Corporation, Santa Clara, CA (US)

(72) Inventors: Subramanya R. Dulloor, Santa Clara, CA (US); Rajesh M Sankaran, Portland, OR (US); Sanjay Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,783

(22) Filed: Jun. 26, 2015

(65) Prior Publication Data
US 2016/0378672 A1 Dec. 29, 2016

(51) Int. Cl.
*G06F 12/0891* (2016.01)
*G06F 3/06* (2006.01)

(52) U.S. Cl.
CPC .......... *G06F 12/0891* (2013.01); *G06F 3/061* (2013.01); *G06F 3/065* (2013.01); *G06F 3/0656* (2013.01); *G06F 3/0688* (2013.01); *G06F 2212/60* (2013.01)

(58) Field of Classification Search
None
See application file for complete search history.

(56) References Cited

U.S. PATENT DOCUMENTS

| 5,887,134 A | 3/1999 | Ebrahim |
| 2013/0086309 A1* | 4/2013 | Lee ...................... G06F 12/0246 711/103 |
| 2014/0258596 A1* | 9/2014 | Kojima ............... G06F 12/0246 711/103 |
| 2014/0365734 A1 | 12/2014 | Bridge, Jr. et al. |
| 2015/0006834 A1 | 1/2015 | Dulloor et al. |

(Continued)

OTHER PUBLICATIONS

Zhao, et al., "Kiln: Closing the Performance Gap between Systems with and without Persistence Support". MICRO-46, Proceedings of the 46th Annual IEEE/ACM International Symposium on Microarchitecture. Dec. 7-11, 2013. Davis, CA, USA, 12 pages.

(Continued)

*Primary Examiner* — Kevin Verbrugge
(74) *Attorney, Agent, or Firm* — Nicholson De Vos Webster & Elliott, LLP

(57) ABSTRACT

Hardware apparatuses and methods for distributed durable and atomic transactions in non-volatile memory are described. In one embodiment, a hardware apparatus includes a hardware processor, a plurality of hardware memory controllers for each of a plurality of non-volatile data storage devices, and a plurality of staging buffers with a staging buffer for each of the plurality of hardware memory controllers, wherein each of the plurality of hardware memory controllers are to: write data of a data set that is to be written to the plurality of non-volatile data storage devices to their staging buffer, send confirmation to the hardware processor that the data is written to their staging buffer, and write the data from their staging buffer to their non-volatile data storage device on receipt of a commit command.

25 Claims, 17 Drawing Sheets

(56) References Cited

U.S. PATENT DOCUMENTS

2016/0179667 A1  6/2016  Kumar et al.
2016/0179687 A1  6/2016  Kumar et al.
2016/0239431 A1  8/2016  Li et al.

OTHER PUBLICATIONS

Venkataraman, et al., "Consistent and Durable Data Structures for Non-Volatile Byte-Addressable Memory". FAST 2011 Proceedings of the 9th USENIX Conference on File and Storage Technologies. Feb. 15-17. San Jose, CA, USA, 15 pages.

* cited by examiner

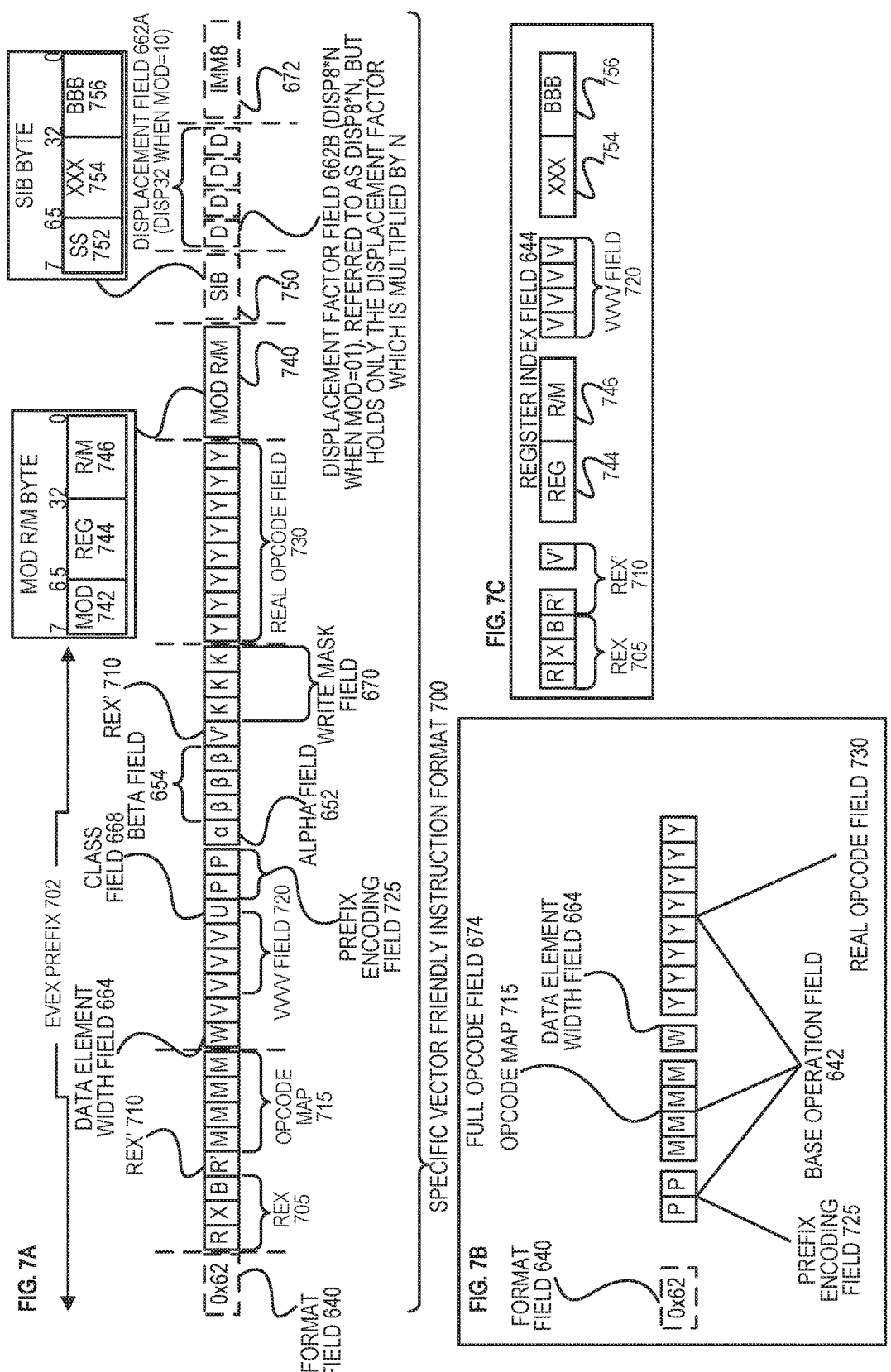

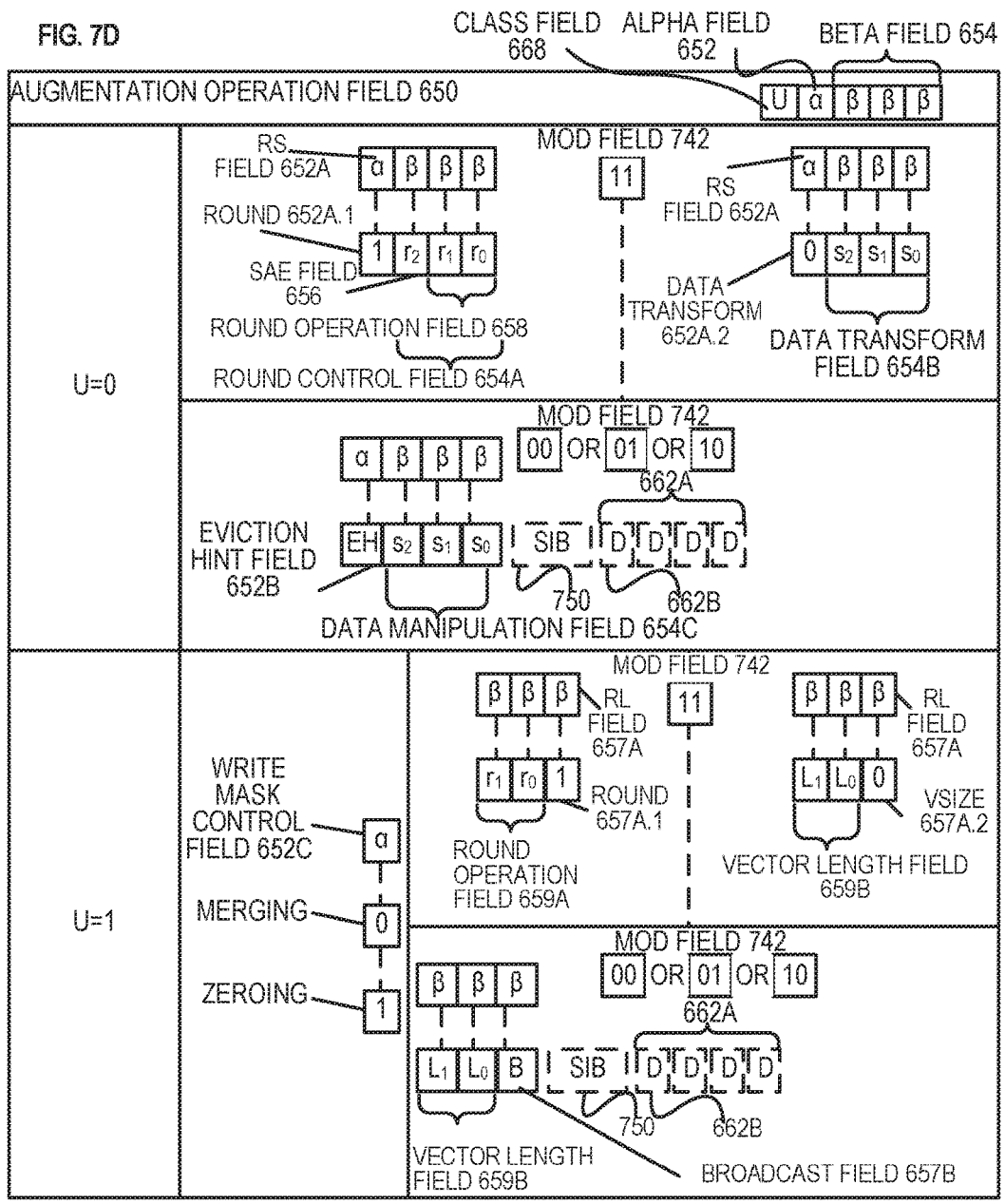

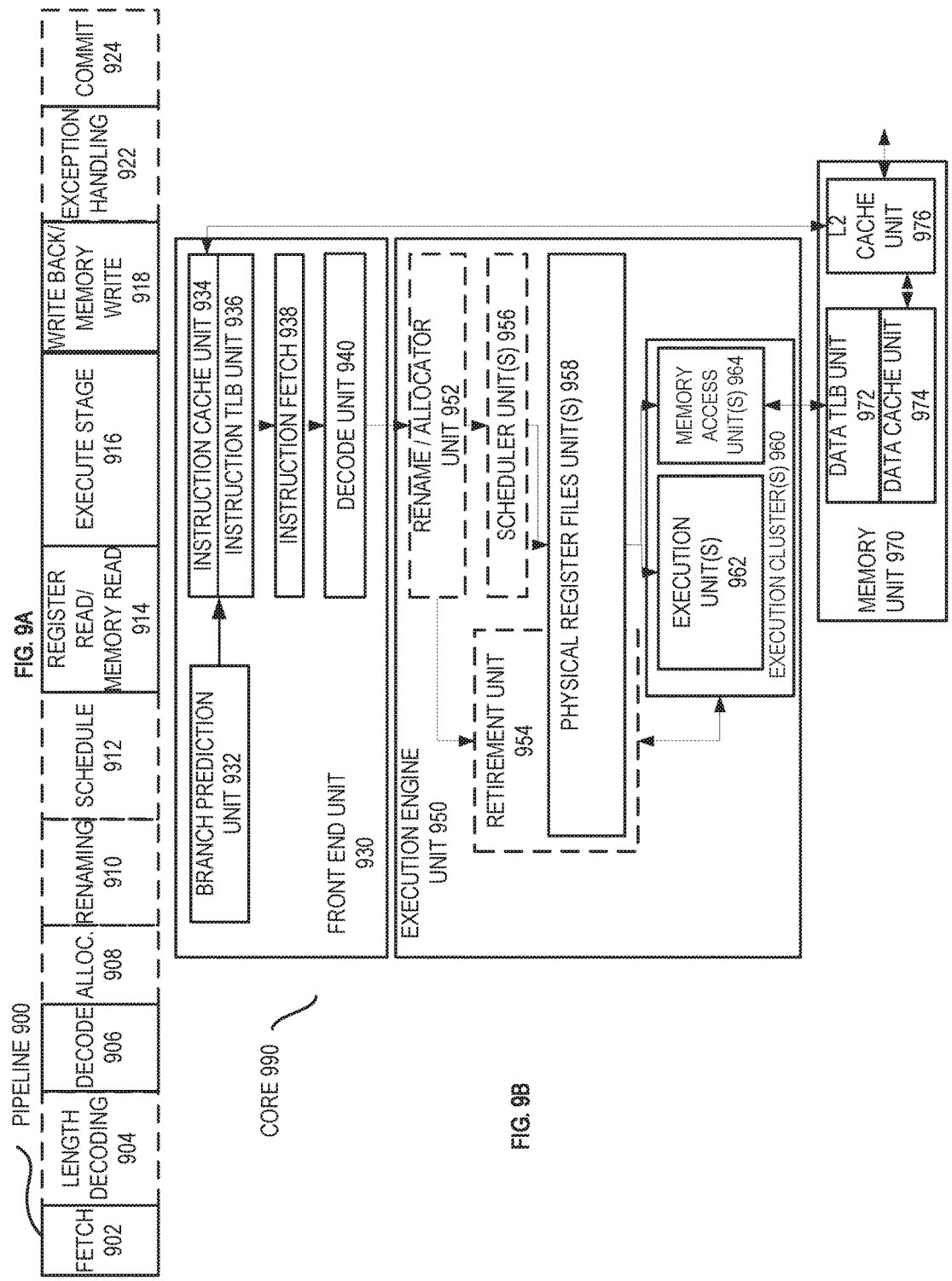

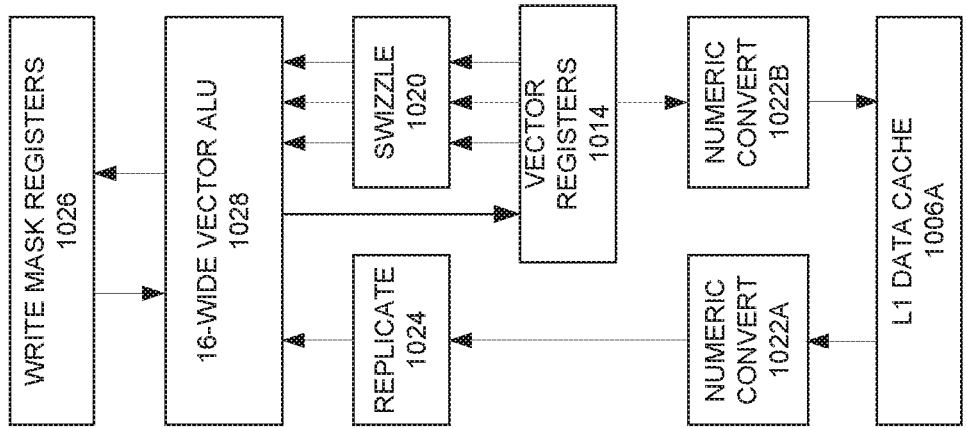
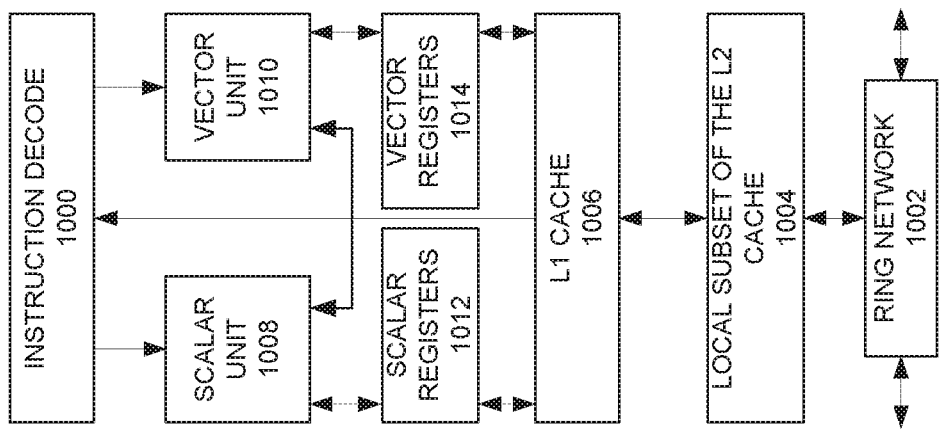

HARDWARE APPARATUSES AND METHODS FOR DISTRIBUTED DURABLE AND ATOMIC TRANSACTIONS IN NON-VOLATILE MEMORY

TECHNICAL FIELD

The disclosure relates generally to electronics, and, more specifically, an embodiment of the disclosure relates to a hardware apparatus for distributed durable and atomic transactions in non-volatile memory.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). A processor may include or include access to a data storage device. A processor may perform operation(s) on data from the data storage device.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 7D is a block diagram illustrating the fields of the specific vector friendly instruction format in FIG. 7A that make up the augmentation operation field 650 according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

FIG. 10A is a block diagram of a single processor core, along with its connection to the on-die interconnect network and with its local subset of the Level 2 (L2) cache, according to embodiments of the disclosure.

FIG. 10B is an expanded view of part of the processor core in FIG. 10A according to embodiments of the disclosure.

DETAILED DESCRIPTION

Figure 1:
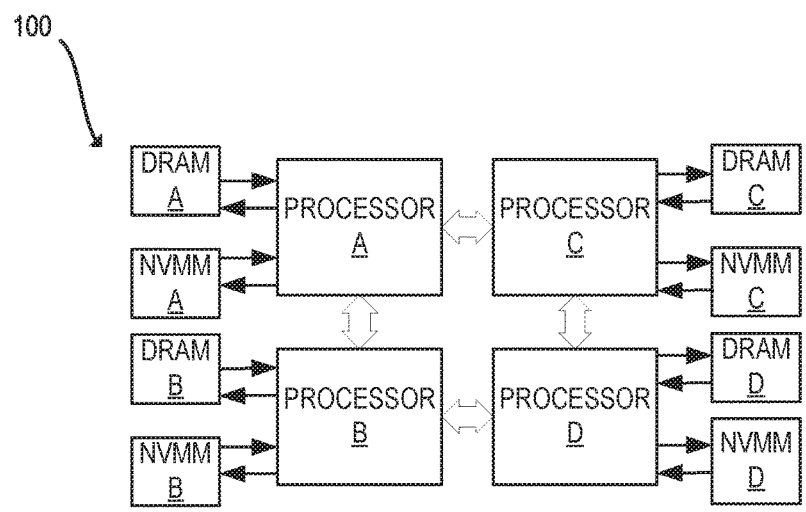
FIG. 1 illustrates a hardware apparatus with multiple processors and non-volatile memory modules according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Instruction processing hardware (e.g., a hardware processor having one or more cores to decode and/or execute instructions) may operate on data, e.g., in performing arithmetic or logic functions. In one embodiment, the data is in vector form, e.g., having multiple elements that are managed as a unit for coherence purposes. In one embodiment, each element is a cache line. Each element of data in a data set may be a single cache line or multiple cache lines. Each section of data may be a plurality of cache lines, e.g., a multiple of a cache line size. A section of data of a data set may be multiple data vectors.

A processor may access (e.g., load and/or store) data in a (e.g., separate from the processor die) data storage device. A data storage device may be system memory, e.g., random-access memory (RAM). A data storage device may not include a processor cache and/or not include external storage, such as, but not limited to, a hard disk drive (HDD) storage. A data storage device (e.g., memory) may be volatile. For example, RAM may be volatile memory. In certain embodiments, a processor may load data into a volatile data storage device from external storage, such as, but not limited to, a hard disk drive (HDD) storage, for example, where the volatile data storage device has a faster access time relative to the access time of the external (e.g., far) storage.

Non-volatile memory (NVM) may include properties of both volatile memory and non-volatile (e.g., persistent) storage. Non-volatile memory may be byte-addressable like volatile (e.g., main) memory (e.g., DRAM), for example, not block addressable like a HDD. Non-volatile memory may provide performance within an order of magnitude of volatile memory (e.g., DRAM). Non-volatile memory may provide persistent storage, e.g., when not powered. Non-volatile memory may be used as system memory. A few non-limiting examples of non-volatile memory are phase change memory (PCM), memristor, and spin-transfer torque RAM (STT-RAM).

In certain embodiment, external storage (e.g., HDD) may be multiple orders of magnitude slower to access than system (e.g., main) memory (e.g., DRAM) and may be block-addressable, for example, such that the external storage is accessed by the processor (e.g., CPU) through an input/output (I/O) controller (e.g., according to Small Computer System Interface (SCSI), Serial ATA (SATA), Peripheral Component Interconnect Express (PCIe), etc.). In an embodiment with (e.g., external) storage residing in a separate address space from that of a processor, an operating system (OS) and drivers may be responsible for materializing storage data being accessed in the (e.g., main) memory of the processor. These additional translations may incur significant (e.g., software) overhead. In certain embodiments, a processor (e.g., of a multiple processor computing system) may include volatile memory (e.g., DRAM) and non-volatile memory that are both connected to the processor memory bus (e.g., and not through an I/O controller) and thus may be part of the same processor addressable (e.g., physical) address space. Byte-addressable non-volatile memory may be referred to as persistent memory (PM).

One processor configuration includes a single level memory (1LM) configuration supporting distinct volatile (e.g., DRAM) and non-volatile (e.g., PM) data storage (e.g., memory) regions. Another processor configuration includes a hierarchical memory configuration, e.g., two level memory (2LM), where volatile memory (e.g., DRAM) may be used as a (e.g., software transparent) near memory cache (NMC) layer while non-volatile memory (e.g., PM) may be used as (e.g., software visible) main memory (e.g., far memory).

Certain embodiments herein are discussed in reference to to a 1LM configuration with distinct volatile memory (e.g., DRAM) and non-volatile memory (e.g., PM) regions, although a hierarchical memory configuration may be utilized in other embodiments herein.

In one single level memory configuration, software applications may use non-volatile memory (e.g., PM) as load and/or store accessible storage. One example of a multiple-processor computing system in 1LM configuration is shown in FIG. 1 (discussed further below). A 1LM system may contain multiple processors (e.g., CPUs), for example, each with one or more memory controllers controlling (e.g., access to) one or more non-volatile data storage devices, for example, PM devices. In one embodiment, non-volatile memory (e.g., PM) has performance within an order of magnitude of volatile memory (e.g., DRAM), for example, reducing software overhead in such usages. For example, copying data between external storage (e.g., through an I/O controller) and processor address space(s) may be a (e.g., main source) of overhead (e.g., time delay) in storage software. Certain embodiments of this disclosure may remove or reduce any overhead as such address space translations may not apply to non-volatile memory (e.g., PM) that is accessed directly, for example, using (e.g., regular) load and store commands (e.g., instructions).

Consistency (e.g., data consistency from software's point of view) in the presence of (e.g., power) failures may be another (e.g., major) source of overhead in storage software. Durability may refer to the Atomicity, Consistency, Isolation, and Durability (ACID) durability property, e.g., to guaranty that (e.g., write) transactions that have committed will survive permanently. One flow in storage-intensive software is to (e.g., durably) write an arbitrary amount of data to arbitrary locations in all-or-none (e.g., atomic) fashion. For example, this may be achieved through the use of one of the following three consistency mechanisms: (1) Copy-on-Write (CoW), (2) Journaling and Logging, and (3) Log Structured Updates. Copy-on-Write may generally refer to when multiple separate processes are to use identical copies of some data (e.g., stored in memory), that a CoW consistency mechanism may keep one copy (e.g., with pointers for each process to that copy) but on the first occasion where a process is to modify the data, the process that is to modify the data is to create its own (e.g., local) copy on which to perform the modification (e.g., the original copy may remain unchanged). In one embodiment, an atomic transaction may refer to an entire transaction (e.g., multiple writes to different locations) completing all the writes and if not then none of the writes are to occur (e.g., all the writes are to not be committed).

Certain embodiments herein may include a non-volatile data storage device (e.g., PM) that is byte-addressable to allow for optimizations to the above mentioned consistency mechanisms. For instance, one embodiment may use atomic writes available in the processor (e.g., processor architecture) to avoid logging (e.g., logging at cache-line granularity), CoW, etc. In one embodiment, logging includes copying data twice, for example, once to a log and once to the final destination (e.g., memory). In one embodiment, consistency in software may be a (e.g., major) source of overhead in data-intensive applications (e.g., such as in memory databases), for example, the overhead attributable to (a) data copies for logging and/or CoW, e.g., for a plurality of writes, (b) barrier operations for durability (e.g., a PCOMMIT instruction for an entire memory range to ensure that everything in the memory range is committed to persistent storage), and (c) software that includes heavy involvement of the operating system (e.g., to handle write faults for CoW).

Certain embodiments herein provide data consistency in software that writes to a non-volatile data storage device (e.g., PM) mapped in its virtual address (VA) space. Certain embodiments herein allow an application to atomically make persistent any number of scattered writes to predefined VA ranges in a non-volatile data storage device (e.g., PM), for example, with the hardware and/or execution of the hardware primitives discussed herein. Certain embodiments herein (e.g., hardware and/or software) may allow non-volatile data storage device (e.g., PM) software to achieve consistency without any data copies in software, e.g., to reduce software overhead and complexity of maintaining consistency. Certain embodiments herein include a server platform with multiple memory controllers and/or platforms with any number of memory controllers (e.g., modules) according to this disclosure.

Certain embodiments herein include hardware (e.g., via execution of hardware primitives) which utilizes OS support. Certain embodiments herein include hardware which does not utilize OS support. Certain embodiments herein utilize hardware that uses a software application with an (e.g., high-level) application program interface (API) that hides its actions from the OS. One example of an (e.g., high-level) API is referred to as "atomic_msync", which may be used by the applications to atomically persist any number of memory stores (e.g., since the last atomic_msync) to a memory-mapped region. In the event of a failure, recovery hardware and/or software may restore the state of the memory-mapped data (e.g., file) to the previous consistency point using the hardware of certain embodiments herein, e.g., by utilizing the hardware primitives. Certain embodiments herein provide hardware (e.g., and hardware extensions and techniques) to achieve light-weight, application-driven persistent atomic transactions in hardware. Certain embodiments herein include a non-volatile data storage device (e.g., PM) that is accessed by a memory controller that does not include an I/O controller. Certain embodiments herein decouple the granularity of tracking (e.g., dirty) data from the processor page granularity by implementing staging buffers, e.g., to hold only writes actually written by the application, which may allow usage with large (e.g., 2M and 1 GB) pages. Certain embodiments herein include a 1LM configuration where entries of a non-volatile data storage device (e.g., PM) are mapped directly into a software application's virtual addresses (VAs).

One embodiment of the disclosure includes a (e.g., less than the size of 1, 2, 3, or 4 pages) power fail-safe buffer for each of a non-volatile data storage device (e.g., controlled by each of a plurality of memory controllers), for example, to stage the writes and allow software (e.g., complete) control of when these writes are persisted. Uncommitted (e.g., dirty) writes in the non-volatile data storage device (e.g., PM) may be persisted or discarded atomically (e.g., under software control), for example, even in the presence of multiple memory controllers with multiple non-volatile data storage devices (e.g., PMs) attached to each of them.

Certain embodiments herein include hardware (e.g., and hardware primitives) to allow software to request persistent atomic updates on discontiguous VA regions. In addition, certain hardware primitives (e.g., extensions) may allow software to atomically commit (e.g., dirty) writes in a non-volatile data storage device (e.g., PM) and/or recover the non-volatile data storage device (e.g., PM) to the previous consistency point, for example, in the case of (e.g., power) failure(s).

In one embodiment, software may write to the non-volatile data storage device (e.g., PM) directly (e.g., to its physical address(es)) using (e.g., regular) load and/or store instructions of a processor's architecture. For consistency, instead of heavy-weight logging and/or CoW mechanisms, software may use certain of the hardware primitives herein to implement a light-weight two-phase commit protocol in the control plane. The complexity of programming the proposed low-level hardware primitives may be hidden behind high-level interfaces. Before discussing FIG. 1, note that a double headed arrow herein may not require two-way communication, for example, it may indicate one-way communication (e.g., to or from that component). A single headed arrow herein may not require one-way communication, for example, it may indicate two-way communication (e.g., to and from that component). Any or all combinations of communications paths may be utilized in embodiments herein, even if not depicted in the figures. A data storage device may be of any size and any number of discrete storage elements.

FIG. 1 illustrates a hardware apparatus 100 with multiple processors (A-D) and respective non-volatile memory modules (NVMMs) (A-D) according to embodiments of the disclosure. A hardware apparatus may include one processor or multiple processors. A processor may communicate with another processor of a hardware apparatus (e.g., a computing system). A processor may communicate with any of the other processors utilized. Although each processor is shown in FIG. 1 as including a volatile data storage device (e.g., depicted as DRAM for each of the processors), this disclosure is not so limited. For example, no volatile data storage device may be present. A single non-volatile data storage device (e.g., memory) module is depicted in communication with each hardware processor. In one embodiment, a hardware processor (e.g., each hardware processor of multiple processors) includes multiple non-volatile data storage device (e.g., memory) modules, e.g., each including one or more non-volatile data storage devices (e.g., memory). One example of the components of a NVMM is depicted in FIG. 2.

Figure 2:
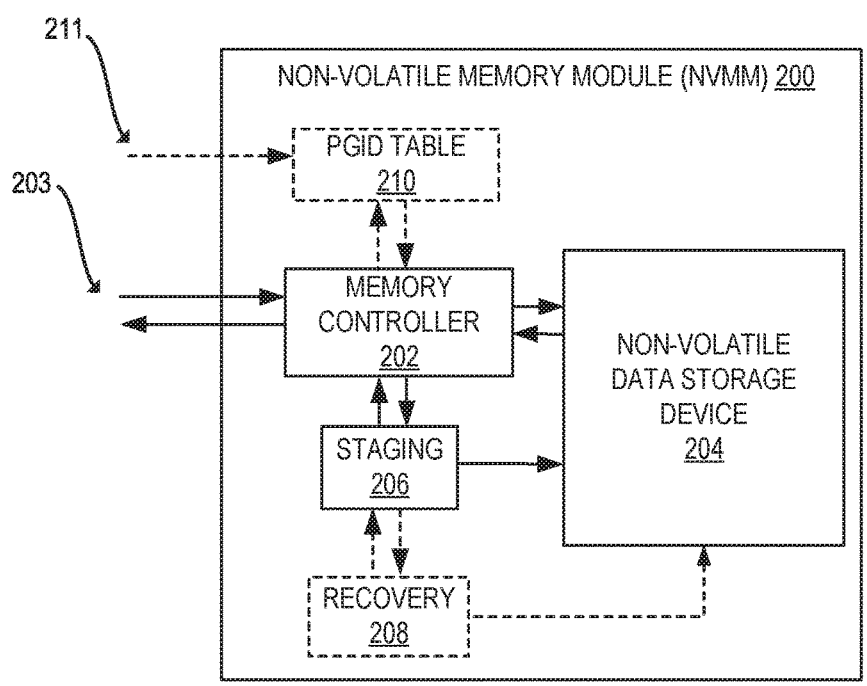
FIG. 2 illustrates a non-volatile memory module according to embodiments of the disclosure.

FIG. 2 illustrates a non-volatile memory module (NVMM 200) according to embodiments of the disclosure. Although non-volatile memory module 200 includes certain components, a non-volatile memory module may include any single or any combination of components. For example, a single non-volatile memory module may have access to multiple non-volatile data storage devices. For example, multiple non-volatile memory modules may each include access to a single non-volatile data storage device, e.g., each module having access to a discrete section of the single non-volatile storage device. A dotted line used in the figures may indicate a component is optional.

Depicted non-volatile memory module 200 includes a memory controller 202. Memory controller 202 may be separate from a memory controller that controls access to secondary (e.g., external) storage (e.g., a HDD). Depicted memory controller 202 includes an input port and an output port at 203, for example, to communicate with a hardware processor (e.g., a core thereof). Memory controller may control each (or any) of the components (or control access to the components). Memory controller may control the flow of data (e.g., data coming in on input and out on an output at 203). Memory controller may include control logic, e.g., according to any method discussed in this disclosure. Memory controller may include a finite state machine (FSM). Depicted non-volatile memory module 200 includes a staging data storage device 206. In one embodiment, the staging data storage device is a data buffer, e.g., volatile. Staging data storage device may be a non-volatile data storage device (e.g., buffer). Depicted non-volatile memory module 200 includes a non-volatile data storage device 204. Non-volatile data storage device 204 may be directly addressable by a processor (e.g., without utilizing an I/O controller), for example, entries in the non-volatile data storage device 204 may be byte-addressable (e.g., persistent memory). In one embodiment, a non-volatile data storage device includes gigabytes or terabytes of storage. Depicted non-volatile memory module 200 includes a page group identification (PGID) table 210, which is discussed further below. Depicted non-volatile memory module 200 includes a recovery data storage device 208, e.g., non-volatile. Although certain connections between components are shown, each component may communicate with any one or more of the other components and/or external to the non-volatile memory module. Although not shown, one or more of the components of the non-volatile memory module 200 may be external to the module 200, for example, located (on die) with a processor.

In one embodiment, each of multiple processors includes a non-volatile memory module. Each non-volatile memory module may include a hardware memory controller, e.g., one for each of a plurality of non-volatile data storage devices. Each non-volatile memory module may include a staging buffer, e.g., one for each of the plurality of hardware memory controllers. Any or all of the plurality of hardware memory controllers (e.g., of a non-volatile memory module) may (i) write data (e.g., of a data set that is to be written to the plurality of non-volatile data storage devices) to their staging buffer, (ii) send confirmation to the hardware processor that the data is written to their staging buffer (e.g., via output at 203), and/or (iii) write the data from their staging buffer to their non-volatile data storage device on receipt of a commit command (e.g., via an input at 203 or input 211).

In one embodiment, a (e.g., software) data write (e.g., to be written to a non-volatile data storage device 204 of a NVMM 200) may be received at an input (e.g., 203) of a memory controller (e.g., memory controller 202). If utilized, the memory controller 202 may check its PGID table 210, e.g., to determine if the data is to be written in (e.g., to an address of) its non-volatile data storage device 204, for example, if the data is part of an active page group. In one embodiment, a processor may update each PGID table 210 with information to map a page group of writes (e.g., that are to be committed atomically) to a physical address(es) in their non-volatile data storage device. In one embodiment, (i) for data that is to be written to the active page group, the NVMM (e.g., memory controller 202) may write the data to their staging buffer and may wait to write the data from their staging buffer to their non-volatile data storage device on receipt of a commit command (e.g., from a processor), and (ii) for data that is not to be written to the active page group, the NVMM (e.g., memory controller 202) may write the data to their non-volatile data storage device (e.g., it may skip the write of the data to their staging buffer and the send of the confirmation).

In one embodiment, the data write (e.g., to be written to a non-volatile data storage device 204 of a NVMM 200) may be provided to (e.g., each) memory controller by a (e.g., separate) memory controller of a processor (e.g., memory controller or memory access unit as described in reference to the processors discussed below), for example, one that does interleaving, e.g., spreading the memory addresses to be used (e.g., evenly) across multiple of the memory device(s) (e.g., non-volatile data storage devices of each NVMM). In one embodiment, the data to be written in each non-volatile data storage device is different from that to be written in the other non-volatile data storage devices.

In one embodiment, the NVMM (e.g., memory controller 202) may flush the data from its staging buffer to its non-volatile recovery data storage device (e.g., 208) in response to a failure (e.g., a power down), for example, before receiving a (e.g., commit) command for the completion of the write of the data from its staging buffer to its non-volatile data storage device. In one embodiment, each NVMM (e.g., each of a plurality of hardware memory controllers) are to flush the data from their staging buffer to their non-volatile recovery data storage device in response to a failure (e.g., a power down of the hardware apparatus), for example, before completion of the write of the data from their staging buffer to their non-volatile data storage device. In one embodiment, a (e.g., separate from the main power supply of a processor and/or computing system (e.g., hardware apparatus 100)) circuit herein may include a power supply to power the flush independent of the failure, e.g., independent of the power down of the hardware apparatus. In one embodiment, a power supply may be a capacitor and/or a battery. For example, a power supply may power the memory controller 202, the staging data storage device 206, the recovery data storage device 208, or any combination thereof.

As one example in reference to FIGS. 1 and 2, data may be sent to be written to non-volatile data storage devices (e.g., in NVMM A and NVMM B). For example, software executing may command a write occur of data, e.g., the string "Hello World". As noted above, portions of the data (e.g., string) may be sent to multiple non-volatile data storage devices. In this example, the "Hello" part of the string may be sent to be saved in a data storage device of NVMM A in FIG. 1 and the "World" part of the string may be sent to be saved in a data storage device of NVMM B in FIG. 1. Software and/or hardware may set an entry (e.g., a PGID) in the PGID table of NVMM A to indicate the address(es) to be utilized to save "Hello" in its non-volatile data storage device and in the PGID table of NVMM B to indicate the address(es) to be utilized to save "World" in its non-volatile data storage device are part of a single atomic action (e.g., to be fully completed or fully not-completed).

Assuming that each NVMM in this example includes its own memory controller 202, staging data storage device 206, and non-volatile data storage device 206 as in FIG. 2, each memory controller may check its PGID table to determine if the data is to be written to an active page group. In one embodiment, if yes, the data (e.g., "Hello" for NVMM A and "World" for NMM) may be written (e.g., by their respective memory controller) to their staging buffer. The data may sit in the staging buffer, for example, until a commit command is received, and then be written (e.g., moved) from their staging buffer to their non-volatile data storage device. A NVMM (e.g., a memory controller) may flush (e.g., all of) the staging buffer when a write (e.g., all writes) to its non-volatile data storage device is complete, e.g., complete for all of the NVMMs committing data for an atomic transaction. In one embodiment, if no, the data (e.g., "Hello" for NVMM A and "World" for NMM) may be written (e.g., by their respective memory controller) to their non-volatile data storage device, e.g., skip the write of the data to their staging buffer and the send of the confirmation.

Certain embodiments of this disclosure include a set of hardware primitives (e.g., available to software) and may include corresponding extensions to non-volatile data storage (e.g., memory) device modules (e.g., persistent memory (PM) modules) to support these primitives. The disclosure below discusses a PM module, but it also may be applicable to other non-volatile data storage devices, e.g., of a NVMM. One example of a PM module is NVMM 200 in FIG. 2, e.g., where there non-volatile data storage device 204 is persistent memory.

1) Hardware primitives: The proposed hardware primitives may be implemented as programmable model-specific registers (MSRs) or as processor instructions (e.g., part of a processor's instruction set). Primitives to create and destroy a persistent atomic PAGE_GROUP and/or modify pages in an existing PAGE_GROUP may be for a user having (e.g., super-user) privileges. Applications may use OS system calls to access these primitives. Transactional primitives (e.g., BEGIN, COMMIT, and ABORT) may be accessible to the applications directly. In certain embodiments:

a) PG_CREATE( ): creates a new PAGE_GROUP denoted by PGID. PGID may represent a set of extents in a system's physical address (PA) that is backed by non-volatile memory (NVM) and to which writes are not persisted until explicitly requested, e.g., by software and/or hardware.

b) PG_ADD(PGID, <PA_base_address>, <length>): adds a range of pages (or addresses) in a system's physical address (PA) space to an existing PAGE_GROUP PGID. Applications may use this primitive via a system call that accepts a range of virtual addresses (VAs). Software (e.g., OS) and/or hardware may translate VAs to PAs and add them (e.g., the translations) to the PGID. Software (e.g., OS) and/or hardware may ensure that accesses to these VA ranges do not generate a page fault and/or the VA-to-PA mappings do not change until the PAGE_GROUP is deleted (e.g., destroyed).

c) PG_DEL(PGID, <PA_base_address>, <length>): removes a previously added range of pages from an existing PAGE_GROUP PGID.

d) PG_DESTROY(PGID): deletes (e.g., destroys) the PAGE_GROUP denoted by PGID.

e) PG_TX_BEGIN(PGID): marks the beginning of a new transaction on the PAGE_GROUP PGID. Writes to PGID may be written to their final destination in PM (e.g., only) when software and/or hardware explicitly requests to with the COMMIT interface.

f) PG_TX_COMMIT(PGID): atomically commits the writes since the start of a previous transaction. In the event of a power failure, PM modules may persist all uncommitted writes to PGID to a temporary location in the PM module (e.g., staging memory 206) and/or wait for recovery (e.g., COMMIT or ABORT) instructions, for example, when powered on the next time.

g) PG_TX_ABORT(PGID): atomically discards the pending uncommitted writes to PGID in the PM modules.

2) PM module extensions: in one embodiment, PM modules include a PM storage device (e.g., a set of PM storage devices) and a memory controller (e.g., memory controller 202 in FIG. 2) that interfaces with the processor and the PM storage device(s), e.g., those PM storage devices that are controlled by that memory controller. In one embodiment, further hardware may include:

a) PGID table: may be a table that maps (e.g., software-defined) PGIDs to addresses in PM, e.g., addresses local to that module. This table may be volatile.

b) STAGING data storage device: may be a power failsafe buffer to hold uncommitted writes in the PM modules. These buffers may be implemented using fast (e.g., faster than accessing a HDD) but volatile memories (e.g., using DRAM), in which case the PM modules may include a sufficient residual energy supply to flush these uncommitted writes to a PM in the event of a power failure. Writes in a STAGING data storage device may be indexed by PGID.

c) RECOVERY data storage device: may be a (e.g., region in) PM to which all uncommitted writes in the staging buffers are flushed to in the event of a power failure. Writes in a RECOVERY data storage device may be indexed by PGID. No separate recovery data storage device (e.g., region of a data storage device) may be utilized in an embodiment where staging buffers are implemented in PM, e.g., in which case staging and recovery data storage devices (e.g., buffers) may be the same device.

3) Hardware control flow: one embodiment of the control flow on the execution of the above mentioned hardware primitives may be as follows:

a) PAGE_GROUP management: when software and/or hardware creates a PAGE_GROUP, a processor (e.g., CPU) may send a message denoting the creation of a new PGID to the PM modules (e.g., via input 211 in FIG. 2). When software and/or hardware adds or deletes (e.g., a page) to or from, respectively, an existing PGID, a processor may send to the PM modules the corresponding message and/or PGID-to-PA mappings (e.g., via input 211 in FIG. 2).

b) PG_TX_BEGIN(PGID): software and/or hardware may mark the beginning of a new transaction on PGID. A processor may send a "BEGIN(PGID)" marker (e.g., to input 211 in FIG. 2) to the PM modules, e.g., each of which in turn may mark the PGID as active locally in a particular PM module. If the number of active PGIDs in a PM module is non-zero, the (e.g., physical) address of every write to the module may be searched for in the PGID (e.g., look-up) table to determine if the write is to an active PGID. If true, the PM module may write (e.g., only) to the staging buffer and wait for (e.g., explicit) instructions from software and/or hardware to commit (e.g., save this staged data to the PM storage device) or to discard this staged data. Otherwise, writes may propagate immediately to their destination PA.

c) PG_TX_COMMIT(PGID): on the execution of this primitive, a processor may send a "COMMIT(PGID)" marker to all PM modules (e.g., to input at 203 in FIG. 2), following which each PM module may independently attempt to commit writes to PGID that are pending in its staging buffers. To atomically commit these pending writes, a PM module may first check (e.g., ensure) that there is enough residual energy to make persistent all staged writes indexed by PGID. Then, the PM module may propagate these writes to their destination in PM and mark that PGID as inactive.

d) PG_TX_ABORT(PGID): software and/or hardware may discard all uncommitted writes to PGID at once by executing the ABORT primitive, e.g., to cause the processor to send an "ABORT(PGID)" marker to all PM modules (e.g., to input at 203 in FIG. 2). On receiving this marker, a PM module may discard all staged writes indexed by PGID and may mark that PGID as inactive.

Figure 3:
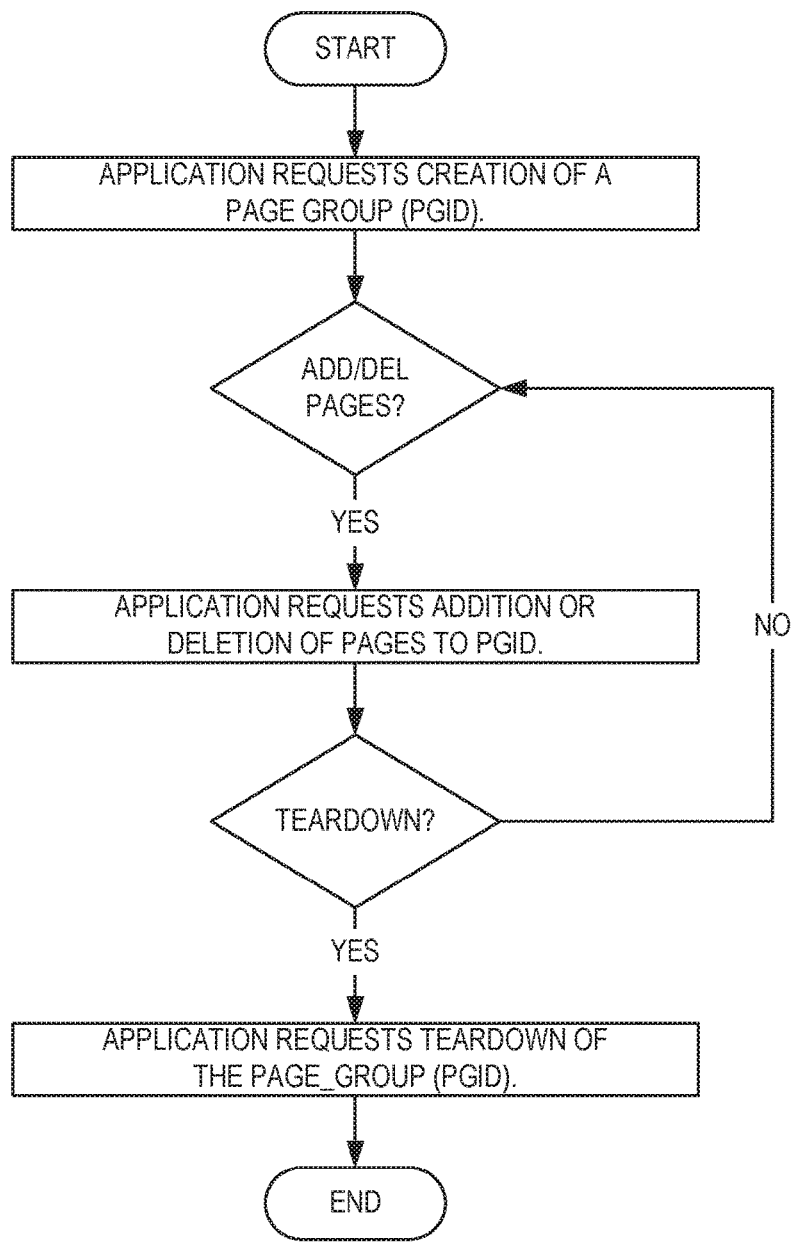
FIG. 3 illustrates a flow diagram according to embodiments of the disclosure.

FIG. 3 illustrates a flow diagram 300 according to embodiments of the disclosure. FIG. 3 is directed to one embodiment of page group (e.g., PAGE_GROUP) management using certain of the above hardware primitives, for example, to achieve consistent and atomic updates to a PAGE_GROUP, e.g., without logging or CoW. At a high-level, this software and/or hardware control flow may guaranty recovery from arbitrary failures, for example, even in the presence of multiple processors and multiple PM modules, e.g., using a two-phase commit protocol. In one embodiment, the (e.g., only) persistent state that software and/or hardware is to maintain is a PGID_STATUS table to record active PGIDs. Software and/or hardware may use cache flush and/or PCOMMIT instructions for consistent updates to the PGID_STATUS table.

Figure 4:
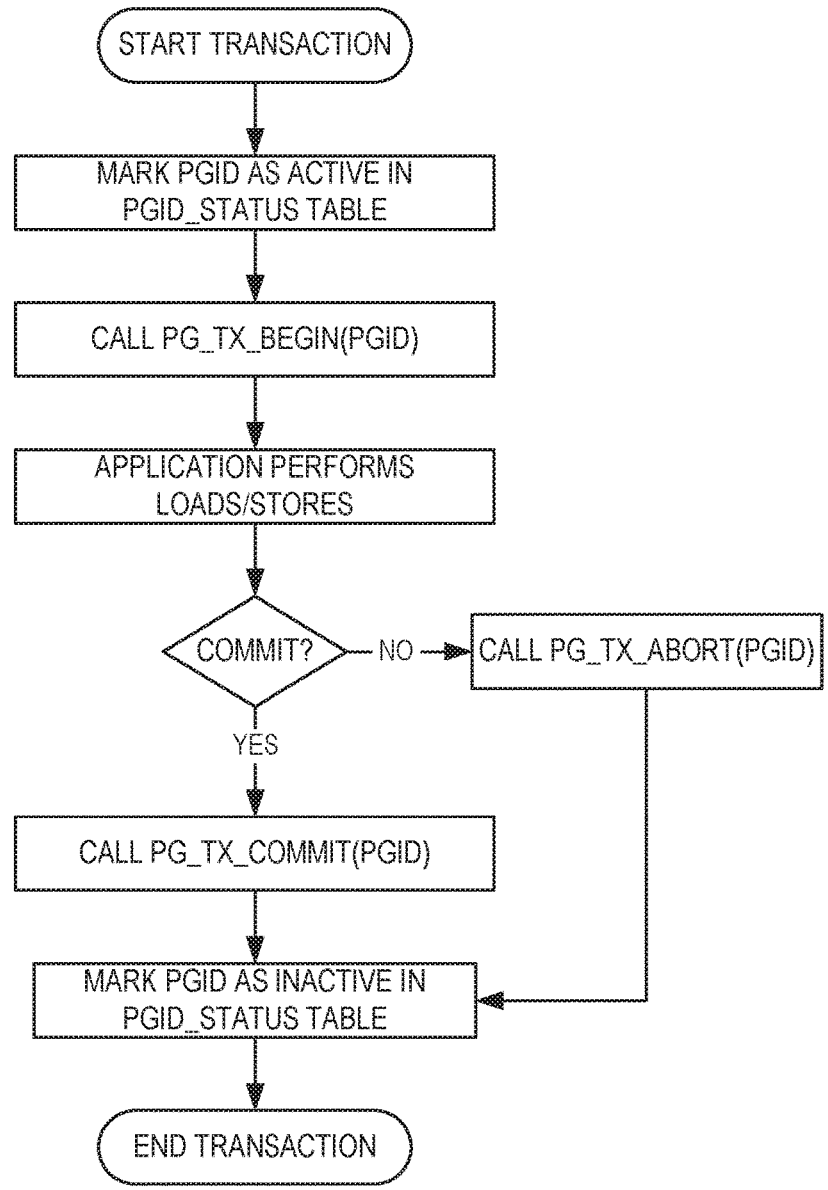
FIG. 4 illustrates a flow diagram according to embodiments of the disclosure.

FIG. 4 illustrates a flow diagram 400 according to embodiments of the disclosure. FIG. 4 is directed to one embodiment to persist atomic transactions. In one embodiment, FIG. 3 is directed to the steps involved in a setup operation and FIG. 4 is directed to an overview of a transactional operation. In one embodiment, the steps for (e.g., normal) transactional operations are:

1) Application software and/or hardware defines a persistent atomic PAGE_GROUP for extents in its address space to which it wants to commit writes atomically. Software and/or hardware receives a handle (PGID) for subsequent operations on the PAGE_GROUP.
2) To mark the beginning of the transaction, software and/or hardware first may mark the PGID as active in the PGID_STATUS table, following which software and/or hardware may invoke PG_TX_BEGIN(PGID) to mark the beginning of the transaction.
3) Reads and writes to PGID are performed, for example, using the processor's (e.g., regular) load and/or store instructions.
4A) To atomically commit writes to PGID since the beginning of the transaction, software and/or hardware executes PG_TX_COMMIT(PGID). On the successful execution of this COMMIT primitive, software and/or hardware marks the PGID as inactive in the PGID_STATUS table.
4B) To atomically discard the writes to PGID since the beginning of the transaction, software and/or hardware executes PG_TX_ABORT(PGID) and marks PGID as inactive in the PGID_STATUS table.

Recovery: in certain systems (e.g., with multiple memory controllers and many PM data storage devices), COMMIT and ABORT requests may reach only a subset of the PM modules in the event of a failure. Embodiments of recovery operations are discussed in the following failure scenarios:
1) Application failures: When an application fails, PGIDs corresponding to the application may be recovered. Software (e.g., an OS executing on a processor) and/or hardware may maintain a separate PGID (e.g., status) table for each application, and the recovery operation in the software (e.g., OS) and/or hardware may limit its scan to the PGIDs in the PGID table of the failed application.
2) System failures (e.g., loss of power): when power to the PM modules is cut off, residual power in the PM modules may ensure that pending writes in their staging buffers are saved to the recovery data storage device (e.g., region). For example, once power is restored, software (e.g., an OS) and/or hardware may scan and recover all PGIDs in the system at the time of failure.
For example, software (e.g., an OS) and/or hardware may perform following actions to recover PGIDs in a PGID (e.g., status) table to a consistent state:
1) Scan PGID_STATUS table for inactive PGIDs and issue PG_TX_COMMIT(PGID) for each of those PGIDs.
2) Scan PGID_STATUS table for active PGIDs and issue PG_TX_ABORT(PGID) for each of those PGIDs.
3) Reset the PGID_STATUS table.

Buffer overflow: The maximum supported size of active PGIDs in a system may depend on the size of staging buffers in the PM modules. To avoid overflow of staging buffers, software (e.g., an OS) and/or hardware may limit the size of active PGIDs by restricting the calls to PG_ADD. PM modules may implement (e.g., very large) staging buffers, for example, using a combination of power-fail safe DRAM and/or SRAM (e.g., for performance) and PM (e.g., for capacity).

Figure 5:
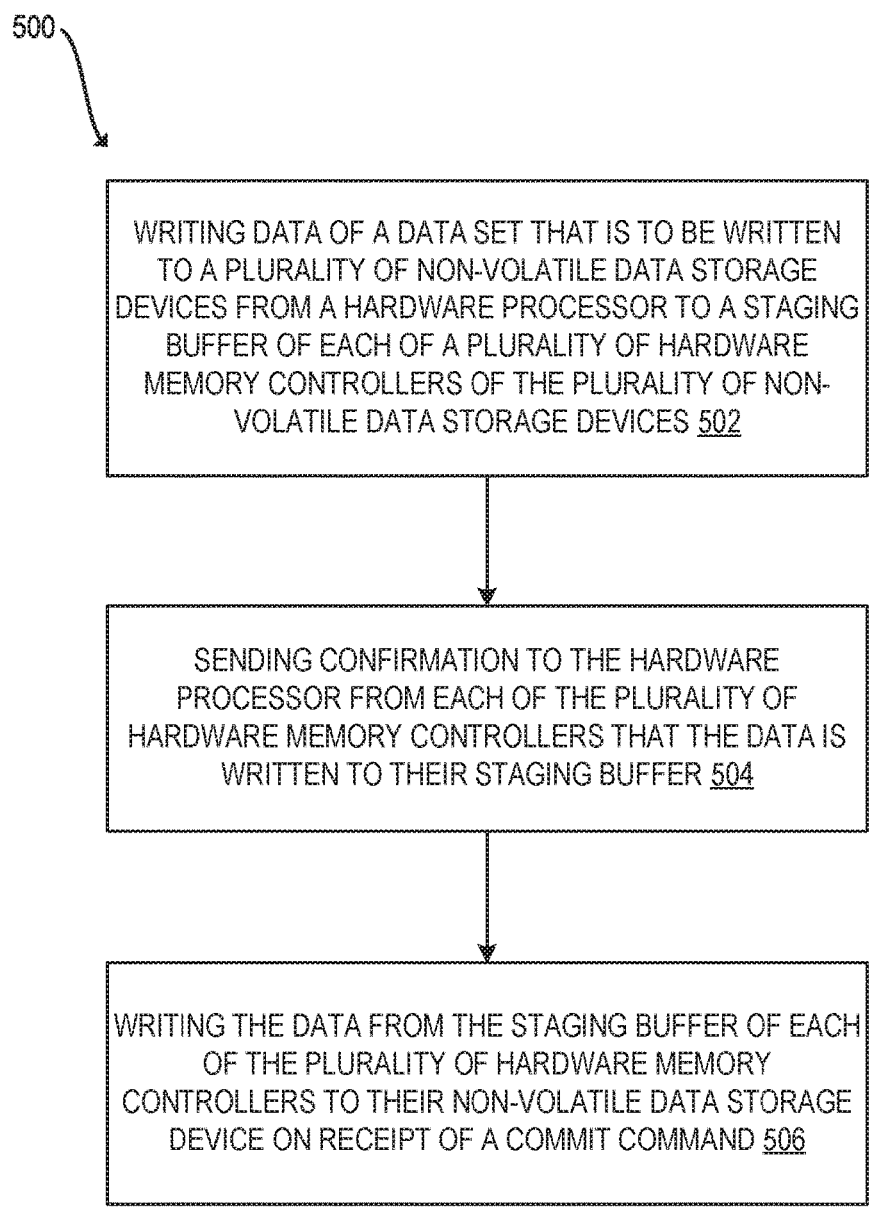
FIG. 5 illustrates a flow diagram according to embodiments of the disclosure.

FIG. 5 illustrates a flow diagram 500 according to embodiments of the disclosure. Depicted flow diagram 500 includes writing data of a data set that is to be written to a plurality of non-volatile data storage devices from a hardware processor to a staging buffer of each of a plurality of hardware memory controllers of the plurality of non-volatile data storage devices 502, sending confirmation to the hardware processor from each of the plurality of hardware memory controllers that the data is written to their staging buffer 504, and writing the data from the staging buffer of each of the plurality of hardware memory controllers to their non-volatile data storage device on receipt of a commit command 506.

In one embodiment, a hardware apparatus includes a hardware processor, a plurality of hardware memory controllers for each of a plurality of non-volatile data storage devices, and a plurality of staging buffers with a staging buffer for each of the plurality of hardware memory controllers, wherein each of the plurality of hardware memory controllers are to: write data of a data set that is to be written to the plurality of non-volatile data storage devices to their staging buffer, send confirmation to the hardware processor that the data is written to their staging buffer, and write the data from their staging buffer to their non-volatile data storage device on receipt of a commit command. The plurality of staging buffers may be non-volatile. The hardware apparatus may further include a plurality of non-volatile recovery data storage devices, wherein each of the plurality of hardware memory controllers are to flush the data from their staging buffer to their non-volatile recovery data storage device in response to a power down of the hardware apparatus before completion of the write of the data from their staging buffer to their non-volatile data storage device. The hardware apparatus may further include a power supply to power the flush independent of the power down of the hardware apparatus. Each of the plurality of hardware memory controllers may write the data from their non-volatile recovery data storage device to their non-volatile data storage device on a power up after the power down. Each of the plurality of hardware memory controllers may further include a table to map a page group of writes that are to be committed atomically to a physical address in their non-volatile data storage device. Each of the plurality of hardware memory controllers may, on receipt of data that is to be written to their non-volatile data storage device, search their table to determine if the data is to be written to an active page group. Each of the plurality of hardware memory controllers may: for data that is to be written to the active page group, write the data to their staging buffer and wait to write the data from their staging buffer to their non-volatile data storage device on receipt of the commit command, and may for data that is not to be written to the active page group, write the data to their non-volatile data storage device and skip the write of the data to their staging buffer and the send of the confirmation. The commit command may be an acknowledgement from the hardware processor of receipt of all of the confirmations.

In another embodiment, a method includes writing data of a data set that is to be written to a plurality of non-volatile data storage devices from a hardware processor to a staging buffer of each of a plurality of hardware memory controllers of the plurality of non-volatile data storage devices, sending confirmation to the hardware processor from each of the plurality of hardware memory controllers that the data is written to their staging buffer, and writing the data from the staging buffer of each of the plurality of hardware memory controllers to their non-volatile data storage device on receipt of a commit command. The method may further include a plurality of non-volatile recovery data storage devices, and flushing, from each of the plurality of hardware memory controllers, the data from their staging buffer to their non-volatile recovery data storage device in response to a power down of their non-volatile data storage device before completion of the write of the data from their staging buffer to their non-volatile data storage device. The method may further include powering the flush independent of the power down of their non-volatile data storage device. The method may further include, for each of the plurality of hardware memory controllers, writing the data from their non-volatile recovery data storage device to their non-volatile data storage device on a power up after the power down. The method may further include for each of the plurality of hardware memory controllers, mapping in a table a page group of writes that are to be committed atomically to a physical address in their non-volatile data storage device. The method may further include, for each of the plurality of hardware memory controllers, on receipt of data that is to be written to their non-volatile data storage device, searching their table to determine if the data is to be written to an active page group. The method may further include, for each of the plurality of hardware memory controllers: for data that is to be written to the active page group, writing the data to their staging buffer and waiting to write the data from their staging buffer to their non-volatile data storage device on receipt of the commit command, and for data that is not to be written to the active page group, writing the data to their non-volatile data storage device and skipping the writing of the data to their staging buffer and the sending of the confirmation. The method may further include sending an acknowledgement from the hardware processor of receipt of all of the confirmations as the commit command.

In yet another embodiment, a non-transitory machine readable storage medium having stored program code that when processed by a machine causes a method to be performed, the method includes writing data of a data set that is to be written to a plurality of non-volatile data storage devices from a hardware processor to a staging buffer of each of a plurality of hardware memory controllers of the plurality of non-volatile data storage devices, sending confirmation to the hardware processor from each of the plurality of hardware memory controllers that the data is written to their staging buffer, and writing the data from the staging buffer of each of the plurality of hardware memory controllers to their non-volatile data storage device on receipt of a commit command. The method may further include a plurality of non-volatile recovery data storage devices, and flushing, from each of the plurality of hardware memory controllers, the data from their staging buffer to their non-volatile recovery data storage device in response to a power down of their non-volatile data storage device before completion of the write of the data from their staging buffer to their non-volatile data storage device. The method may further include powering the flush independent of the power down of their non-volatile data storage device. The method may further include, for each of the plurality of hardware memory controllers, writing the data from their non-volatile recovery data storage device to their non-volatile data storage device on a power up after the power down. The method may further include for each of the plurality of hardware memory controllers, mapping in a table a page group of writes that are to be committed atomically to a physical address in their non-volatile data storage device. The method may further include, for each of the plurality of hardware memory controllers, on receipt of data that is to be written to their non-volatile data storage device, searching their table to determine if the data is to be written to an active page group. The method may further include, for each of the plurality of hardware memory controllers: for data that is to be written to the active page group, writing the data to their staging buffer and waiting to write the data from their staging buffer to their non-volatile data storage device on receipt of the commit command, and for data that is not to be written to the active page group, writing the data to their non-volatile data storage device and skipping the writing of the data to their staging buffer and the sending of the confirmation. The method may further include sending an acknowledgement from the hardware processor of receipt of all of the confirmations as the commit command.

In another embodiment, a hardware apparatus includes a hardware processor, a plurality of hardware memory controllers for each of a plurality of non-volatile data storage devices, a plurality of staging buffers with a staging buffer for each of the plurality of hardware memory controllers, wherein each of the plurality of hardware memory controllers includes means to: write data of a data set that is to be written to the plurality of non-volatile data storage devices to their staging buffer, send confirmation to the hardware processor that the data is written to their staging buffer, and write the data from their staging buffer to their non-volatile data storage device on receipt of a commit command.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, April 2015; and see Intel® Architecture Instruction Set Extensions Programming Reference, October 2014).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
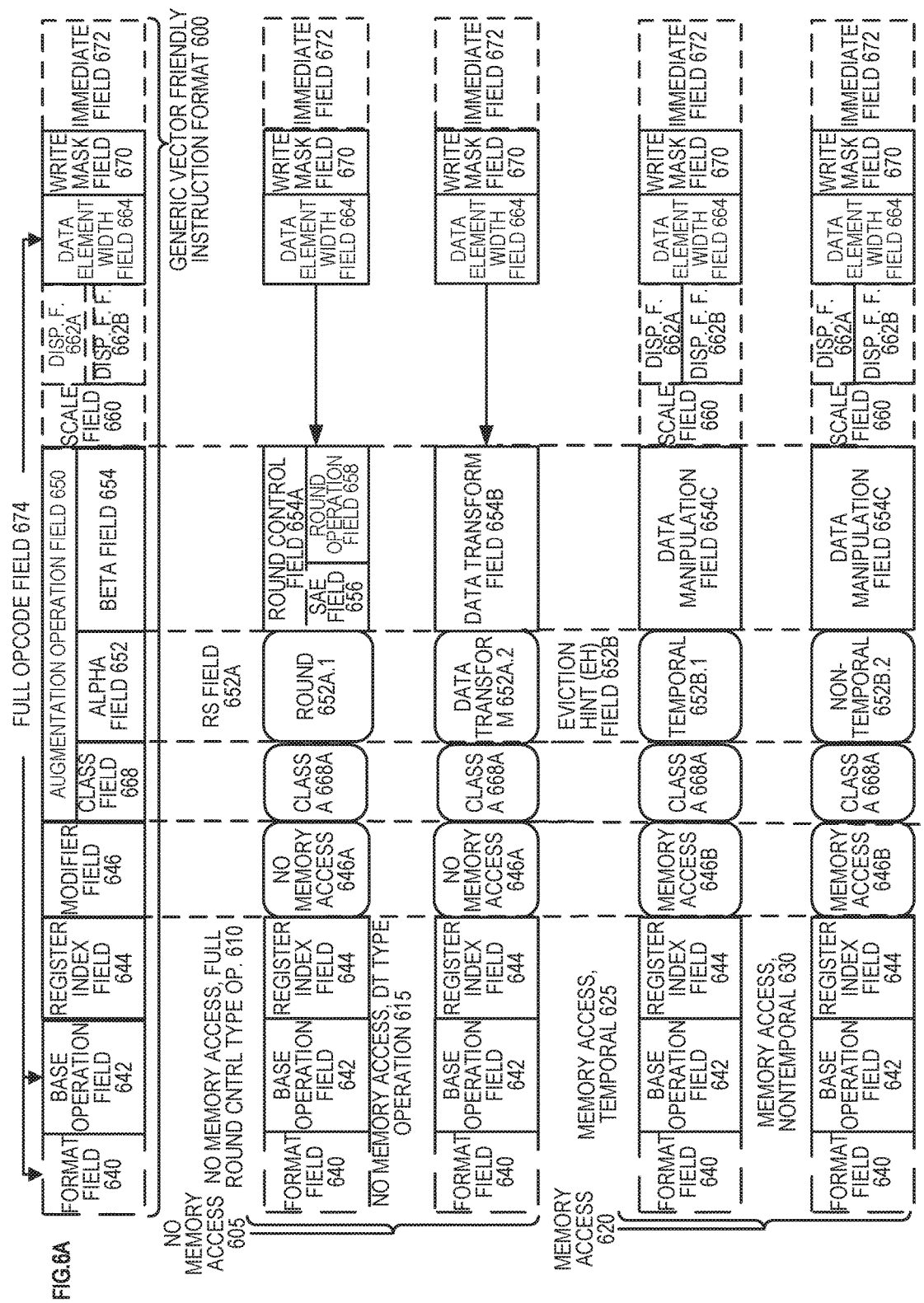
FIG. 6A is a block diagram illustrating a generic vector friendly instruction format and class A instruction templates thereof according to embodiments of the disclosure.
Figure 6B:
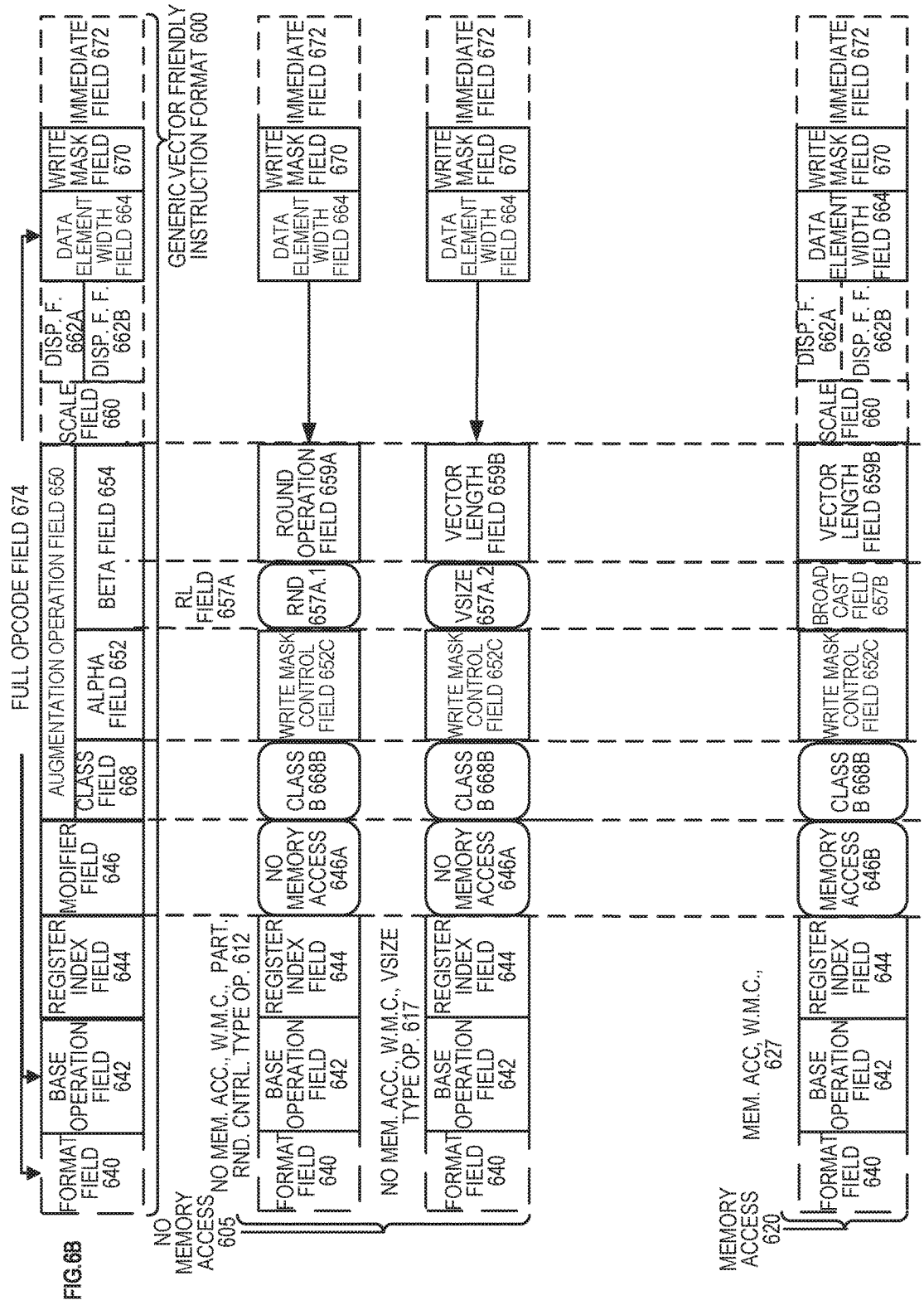
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}$*index+base).

Displacement Field 662A—its content is used as part of memory address generation (e.g., for address generation that uses $2^{scale}$*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8;

when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
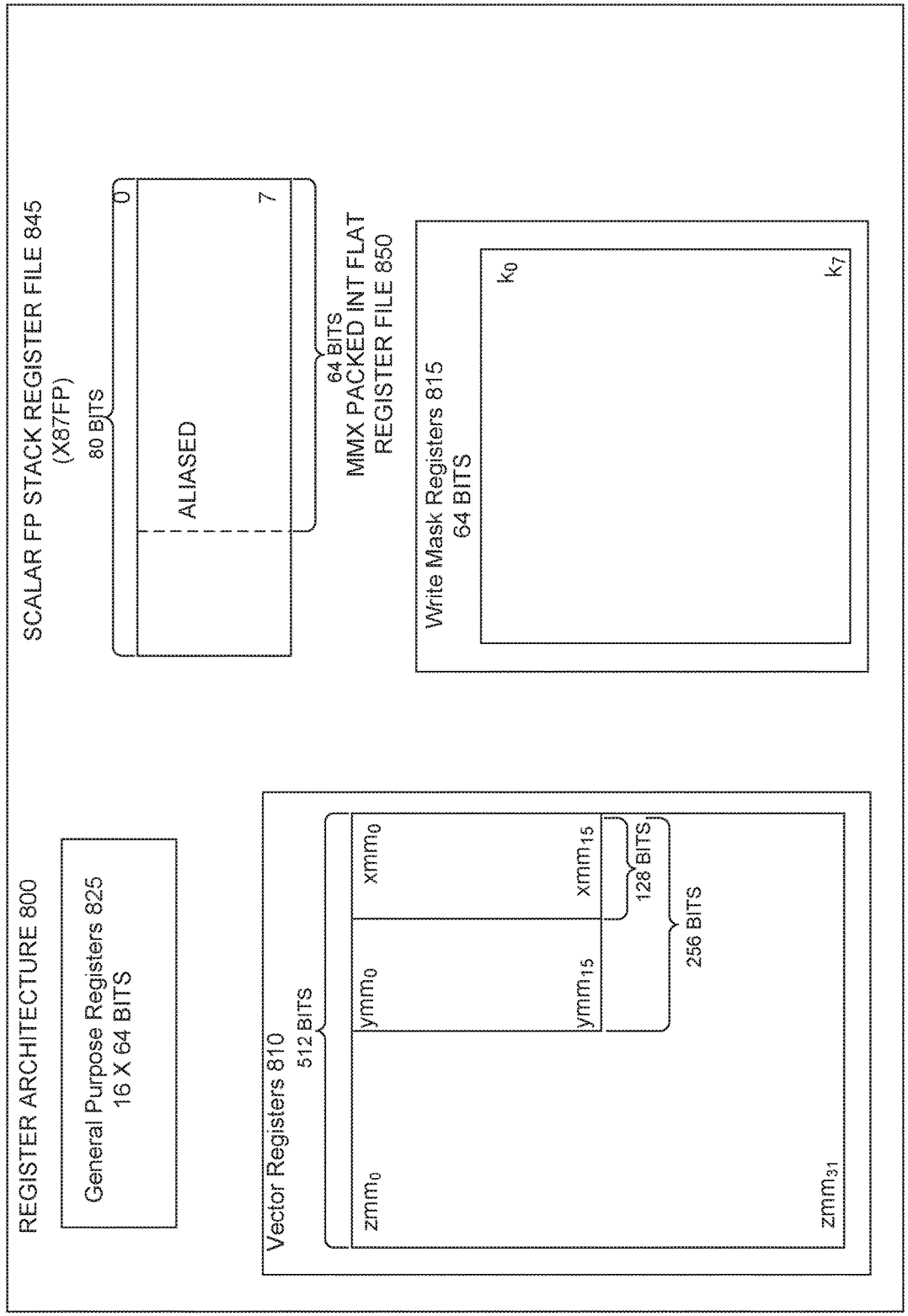
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
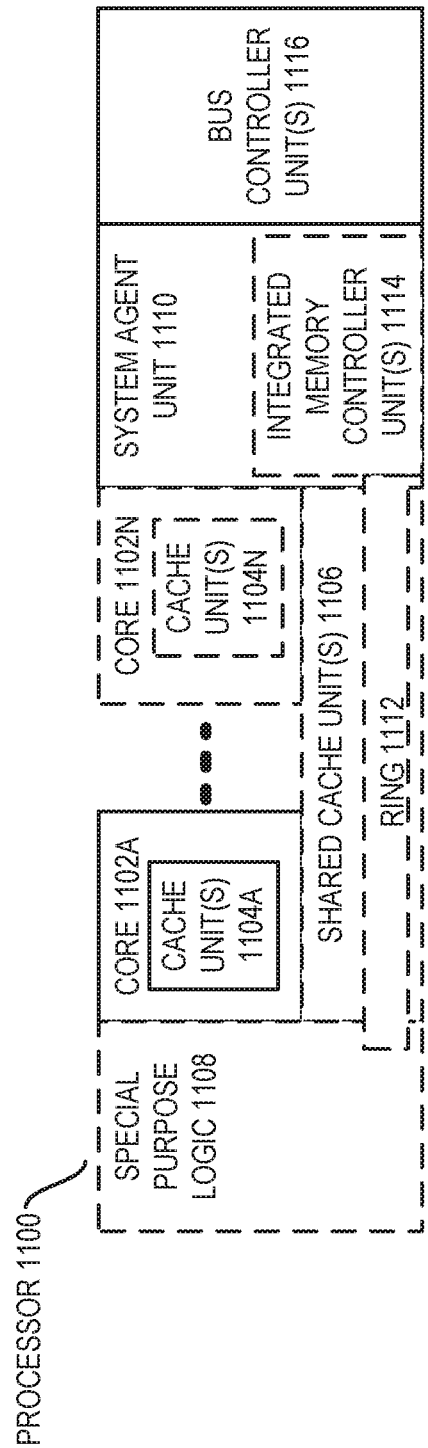
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
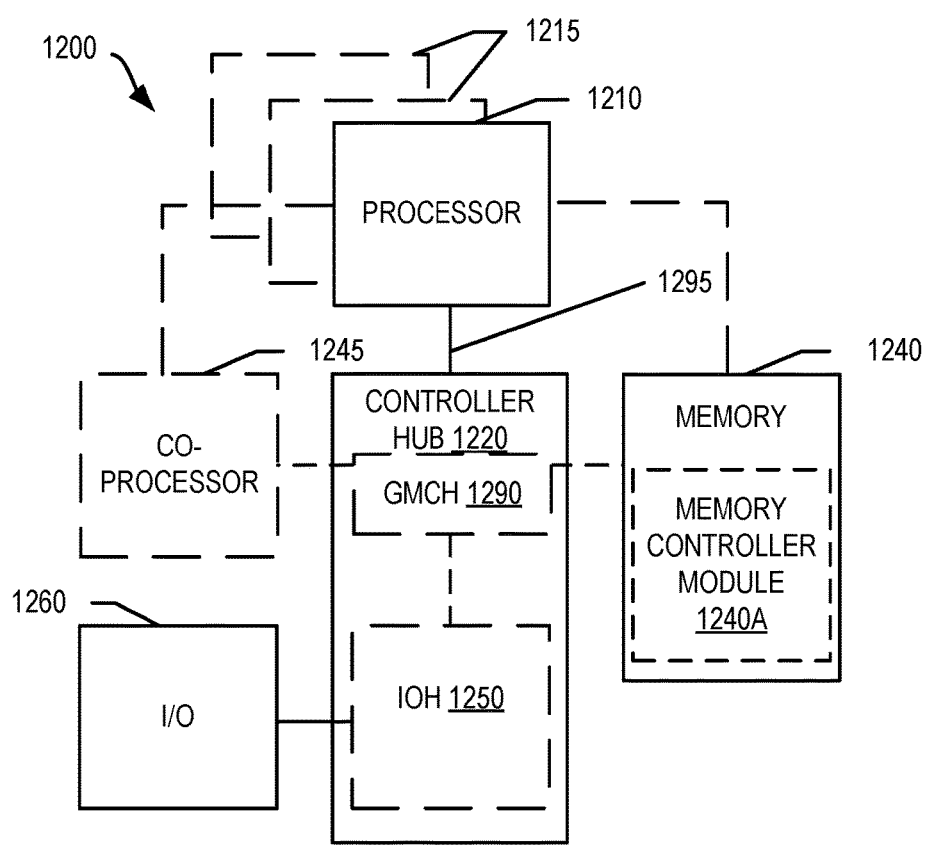
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include a memory controller module 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
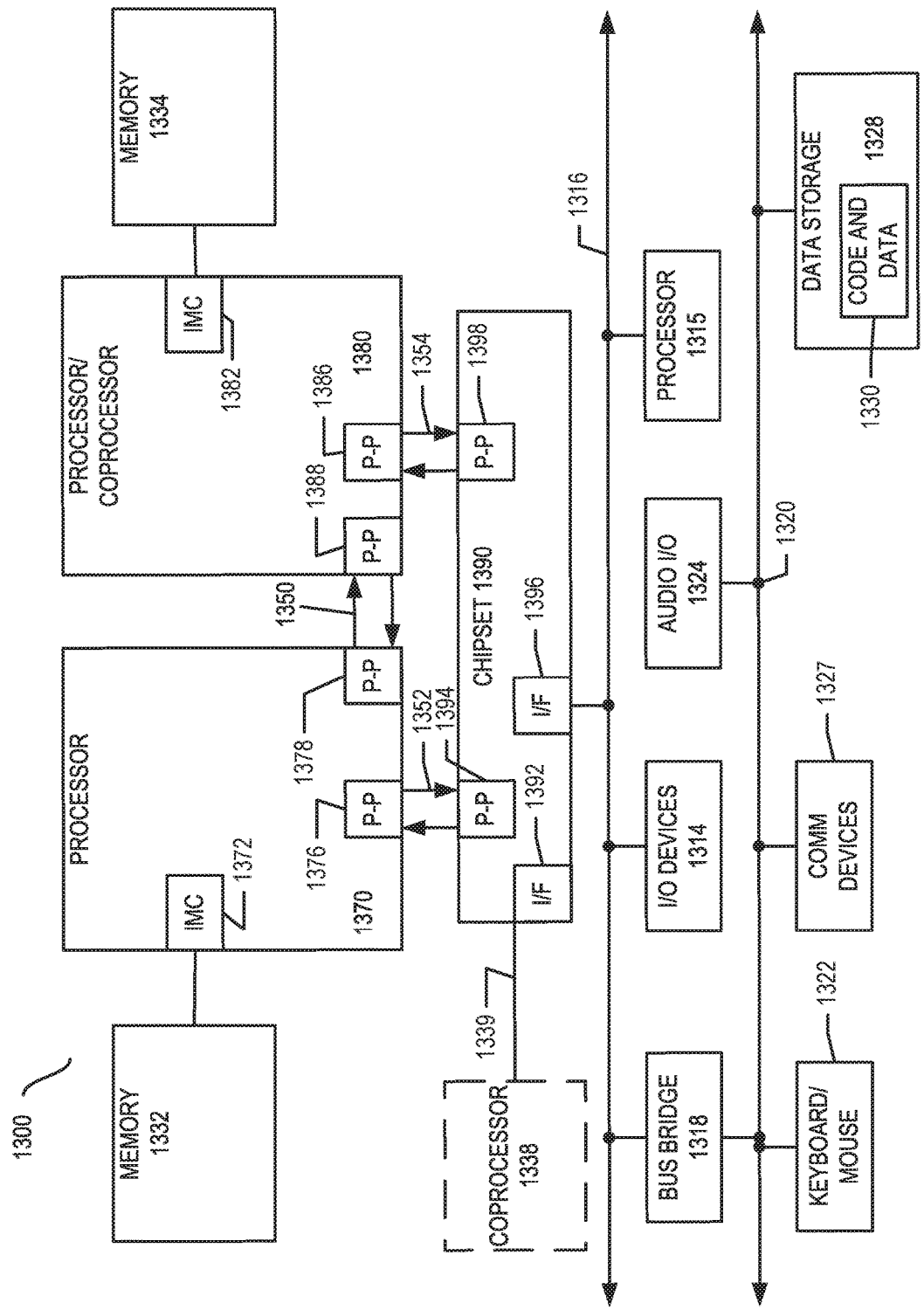
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
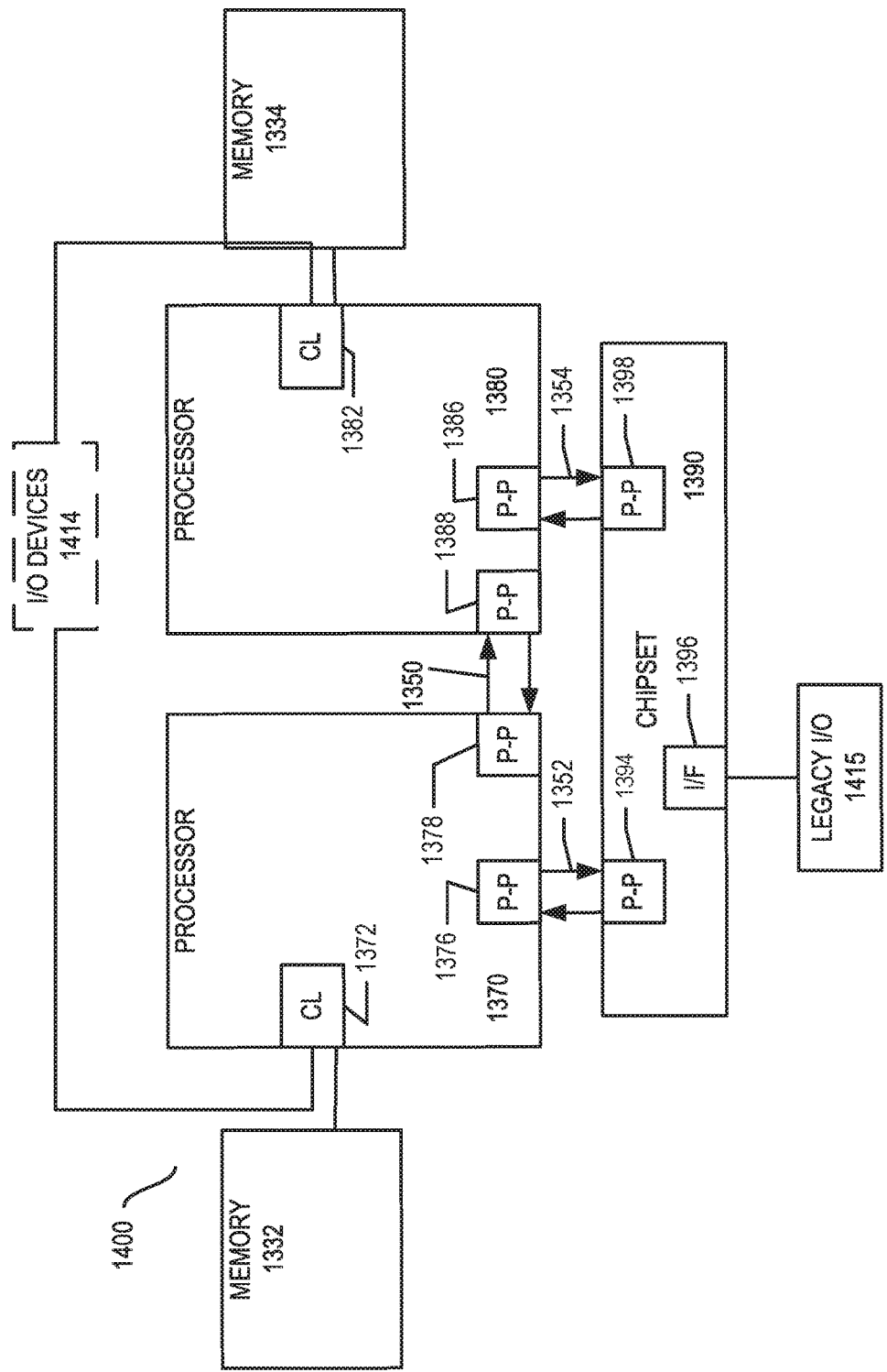
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
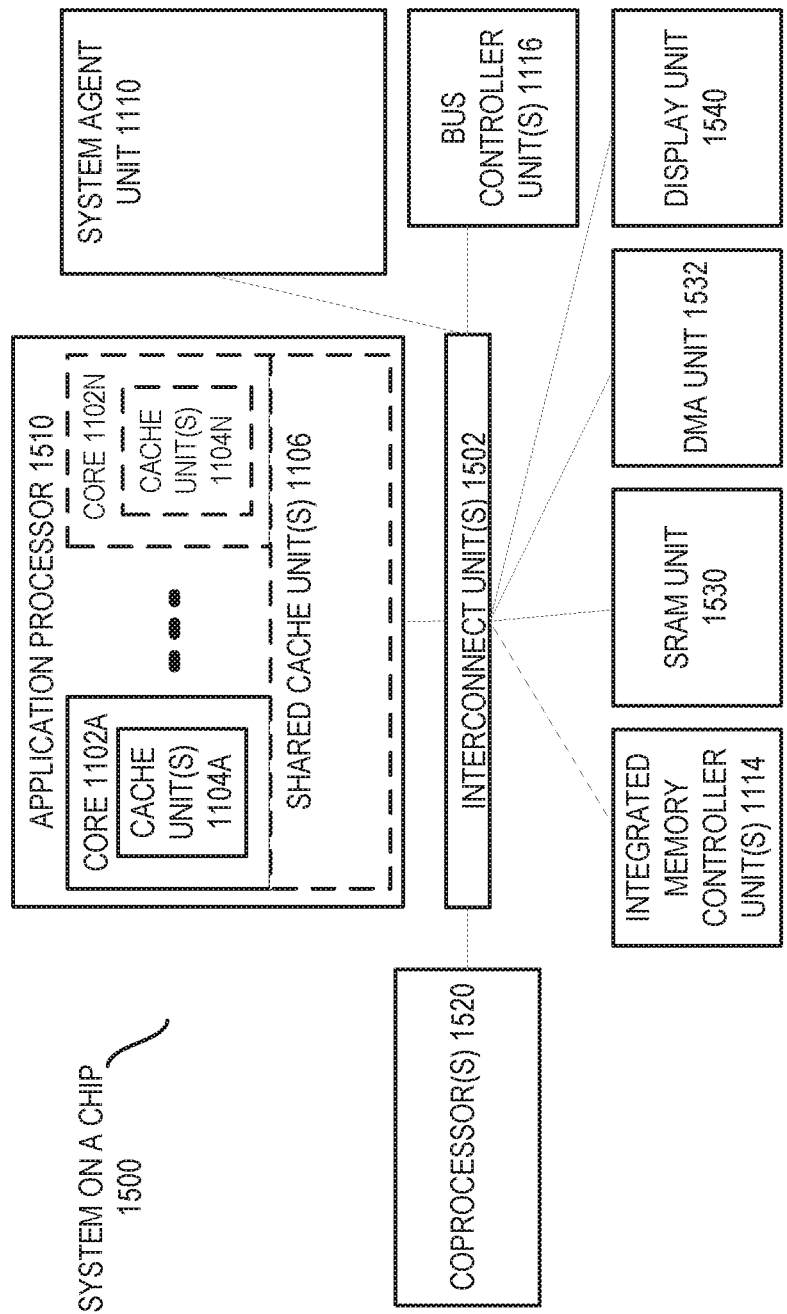
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
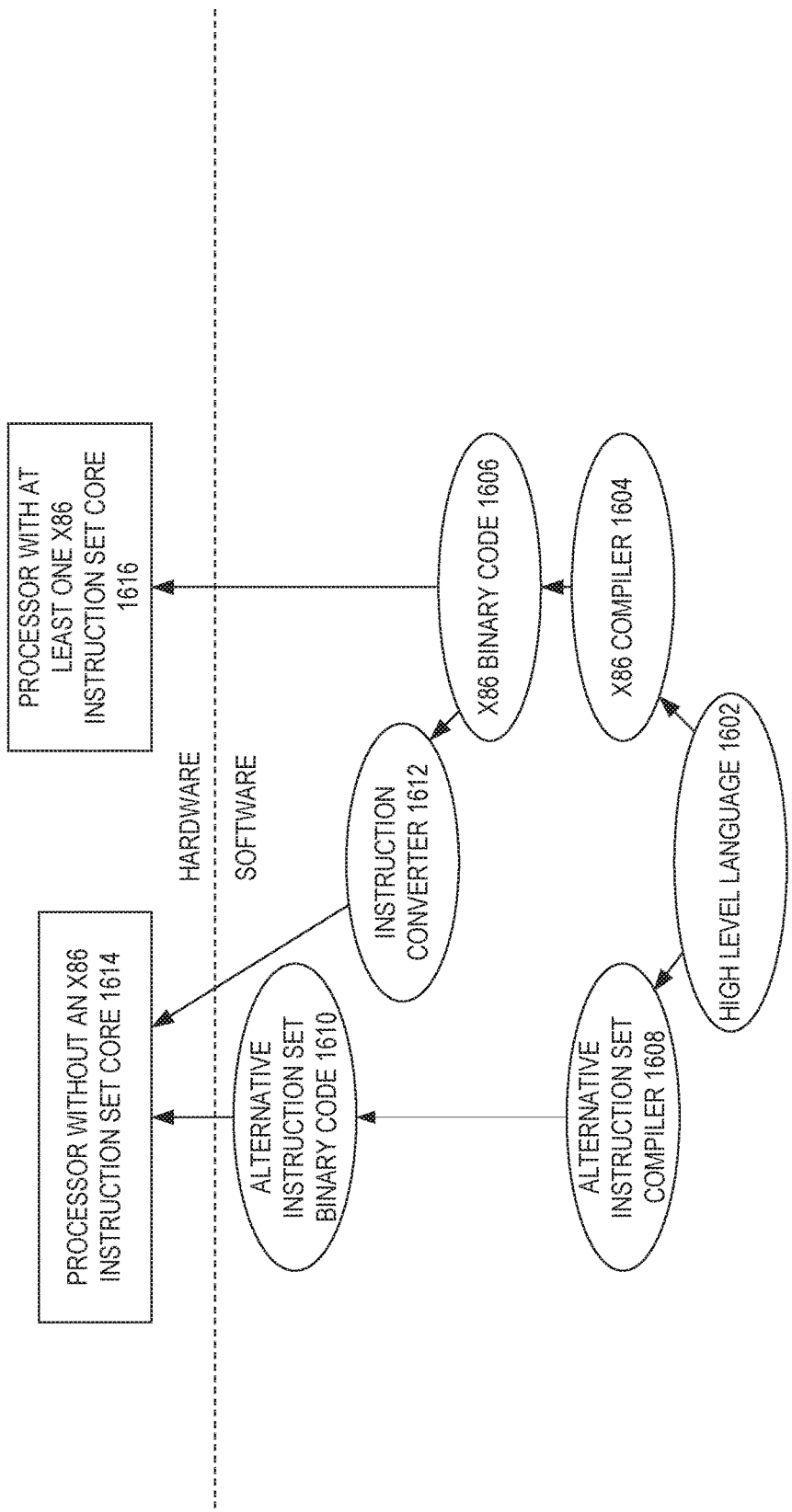
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:
1. A hardware apparatus comprising:
a hardware processor;
a plurality of hardware memory controllers for each of a plurality of non-volatile data storage devices; and
a plurality of staging buffers with a staging buffer for each of the plurality of hardware memory controllers, wherein each of the plurality of hardware memory controllers are to:
write data of a data set that is to be written to the plurality of non-volatile data storage devices to their staging buffer,
send confirmation to the hardware processor that the data is written to their staging buffer, and
write the data from their staging buffer to their non-volatile data storage device on receipt of a commit command.
2. The hardware apparatus of claim 1, wherein the plurality of staging buffers are non-volatile.
3. The hardware apparatus of claim 1, further comprising a plurality of non-volatile recovery data storage devices, wherein each of the plurality of hardware memory controllers are to flush the data from their staging buffer to their non-volatile recovery data storage device in response to a power down of the hardware apparatus before completion of the write of the data from their staging buffer to their non-volatile data storage device.
4. The hardware apparatus of claim 3, further comprising a power supply to power the flush independent of the power down of the hardware apparatus.
5. The hardware apparatus of claim 3, wherein each of the plurality of hardware memory controllers are to write the data from their non-volatile recovery data storage device to their non-volatile data storage device on a power up after the power down.
6. The hardware apparatus of claim 1, wherein each of the plurality of hardware memory controllers further comprises a table to map a page group of writes that are to be committed atomically to a physical address in their non-volatile data storage device.
7. The hardware apparatus of claim 6, wherein each of the plurality of hardware memory controllers are, on receipt of data that is to be written to their non-volatile data storage device, to search their table to determine if the data is to be written to an active page group.
8. The hardware apparatus of claim 7, wherein each of the plurality of hardware memory controllers are:
for data that is to be written to the active page group, write the data to their staging buffer and wait to write the data from their staging buffer to their non-volatile data storage device on receipt of the commit command, and
for data that is not to be written to the active page group, write the data to their non-volatile data storage device and skip the write of the data to their staging buffer and the send of the confirmation.
9. The hardware apparatus of claim 1, wherein the commit command is an acknowledgement from the hardware processor of receipt of all of the confirmations.
10. A method comprising:
writing data of a data set that is to be written to a plurality of non-volatile data storage devices from a hardware processor to a staging buffer of each of a plurality of hardware memory controllers of the plurality of non-volatile data storage devices;

sending confirmation to the hardware processor from each of the plurality of hardware memory controllers that the data is written to their staging buffer; and writing the data from the staging buffer of each of the plurality of hardware memory controllers to their non-volatile data storage device on receipt of a commit command.

11. The method of claim 10, further comprising a plurality of non-volatile recovery data storage devices, and flushing, from each of the plurality of hardware memory controllers, the data from their staging buffer to their non-volatile recovery data storage device in response to a power down of their non-volatile data storage device before completion of the write of the data from their staging buffer to their non-volatile data storage device.

12. The method of claim 11, further comprising powering the flush independent of the power down of their non-volatile data storage device.

13. The method of claim 11, further comprising, for each of the plurality of hardware memory controllers, writing the data from their non-volatile recovery data storage device to their non-volatile data storage device on a power up after the power down.

14. The method of claim 10, further comprising, for each of the plurality of hardware memory controllers, mapping in a table a page group of writes that are to be committed atomically to a physical address in their non-volatile data storage device.

15. The method of claim 14, further comprising, for each of the plurality of hardware memory controllers, on receipt of data that is to be written to their non-volatile data storage device, searching their table to determine if the data is to be written to an active page group.

16. The method of claim 15, further comprising, for each of the plurality of hardware memory controllers:

for data that is to be written to the active page group, writing the data to their staging buffer and waiting to write the data from their staging buffer to their non-volatile data storage device on receipt of the commit command, and for data that is not to be written to the active page group, writing the data to their non-volatile data storage device and skipping the writing of the data to their staging buffer and the sending of the confirmation.

17. The method of claim 10, further comprising sending an acknowledgement from the hardware processor of receipt of all of the confirmations as the commit command.

18. A non-transitory machine readable storage medium having stored program code that when processed by a machine causes a method to be performed, the method comprising:

writing data of a data set that is to be written to a plurality of non-volatile data storage devices from a hardware processor to a staging buffer of each of a plurality of hardware memory controllers of the plurality of non-volatile data storage devices;

sending confirmation to the hardware processor from each of the plurality of hardware memory controllers that the data is written to their staging buffer; and writing the data from the staging buffer of each of the plurality of hardware memory controllers to their non-volatile data storage device on receipt of a commit command.

19. The non-transitory machine readable storage medium of claim 18, further comprising a plurality of non-volatile recovery data storage devices, and the method further comprising flushing, from each of the plurality of hardware memory controllers, the data from their staging buffer to their non-volatile recovery data storage device in response to a power down of their non-volatile data storage device before completion of the write of the data from their staging buffer to their non-volatile data storage device.

20. The non-transitory machine readable storage medium of claim 19, the method further comprising powering the flush independent of the power down of their non-volatile data storage device.

21. The non-transitory machine readable storage medium of claim 19, the method further comprising, for each of the plurality of hardware memory controllers, writing the data from their non-volatile recovery data storage device to their non-volatile data storage device on a power up after the power down.

22. The non-transitory machine readable storage medium of claim 18, the method further comprising, for each of the plurality of hardware memory controllers, mapping in a table a page group of writes that are to be committed atomically to a physical address in their non-volatile data storage device.

23. The non-transitory machine readable storage medium of claim 22, the method further comprising, for each of the plurality of hardware memory controllers, on receipt of data that is to be written to their non-volatile data storage device, searching their table to determine if the data is to be written to an active page group.

24. The non-transitory machine readable storage medium of claim 23, the method further comprising, for each of the plurality of hardware memory controllers:

for data that is to be written to the active page group, writing the data to their staging buffer and waiting to write the data from their staging buffer to their non-volatile data storage device on receipt of the commit command, and for data that is not to be written to the active page group, writing the data to their non-volatile data storage device and skipping the writing of the data to their staging buffer and the sending of the confirmation.

25. The non-transitory machine readable storage medium of claim 18, the method further comprising sending an acknowledgement from the hardware processor of receipt of all of the confirmations as the commit command.

* * * * *